(12) United States Patent
Liu et al.

(10) Patent No.: US 11,676,358 B2
(45) Date of Patent: Jun. 13, 2023

(54) METHOD AND APPARATUS FOR DIGITIZING PAPER DATA, ELECTRONIC DEVICE AND STORAGE MEDIUM

(71) Applicant: Beijing Baidu Netcom Science Technology Co., Ltd., Beijing (CN)

(72) Inventors: Yabo Liu, Beijing (CN); Jianfa Zou, Beijing (CN); Lei Nie, Beijing (CN); Feng Huang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 13 days.

(21) Appl. No.: 17/349,263

(22) Filed: Jun. 16, 2021

(65) Prior Publication Data
US 2022/0004752 A1   Jan. 6, 2022

(30) Foreign Application Priority Data

Nov. 17, 2020   (CN) .......................... 202011290842.7

(51) Int. Cl.
*G06V 10/22* (2022.01)
*G06V 10/75* (2022.01)
(Continued)

(52) U.S. Cl.
CPC ............ *G06V 10/22* (2022.01); *G06V 10/751* (2022.01); *G06V 10/82* (2022.01); *G06V 10/945* (2022.01);
(Continued)

(58) Field of Classification Search
CPC .... G06V 30/36; G06V 10/751; G06V 30/153; G06V 30/274; G06V 30/412;
(Continued)

(56) References Cited

U.S. PATENT DOCUMENTS

| 2015/0071500 | A1* | 3/2015 | Kim ..................... G06V 30/412 |
| | | | 382/112 |
| 2017/0193292 | A1* | 7/2017 | Bellert ................. G06V 30/412 |

(Continued)

FOREIGN PATENT DOCUMENTS

JP   2017-151953 A   8/2017

OTHER PUBLICATIONS

Cheng, et al. "Handwriting and Hand-Sketched Graphics Detection Using Convolutional Neural Networks" Springer Nature Switzerland AG 2020, Y. Lu et al. (Eds ): ICPRAI 2020, LNCS 12068, pp. 352-362, 2020.

(Continued)

*Primary Examiner* — Amandeep Saini
*Assistant Examiner* — Daniella M. DiGuglielmo
(74) *Attorney, Agent, or Firm* — Tucker Ellis LLP

(57) ABSTRACT

The present application discloses a method and apparatus for digitizing paper data, an electronic device and a storage medium, relating to fields of image processing and cloud computing, in particular to image recognition technologies. The method includes: determining a standard template according to an image to be processed and mark information corresponding to the image to be processed, wherein the image to be processed is obtained by photographing paper data and the standard template is used to represent a reference coordinate system of the image to be processed; recognizing graphic handwriting information comprised in the image to be processed; and generating digitized data corresponding to the image to be processed according to the graphic handwriting information and the standard template.

17 Claims, 15 Drawing Sheets

(51) Int. Cl.
| | |
|---|---|
| *G06V 30/412* | (2022.01) |
| *G06V 30/19* | (2022.01) |
| *G06V 10/82* | (2022.01) |
| *G06V 10/94* | (2022.01) |
| *G06V 20/56* | (2022.01) |
| *G06V 30/413* | (2022.01) |
| *G06V 30/422* | (2022.01) |
| *G06V 30/32* | (2022.01) |
| *G06V 30/148* | (2022.01) |
| *G06V 30/262* | (2022.01) |
| *G06V 30/40* | (2022.01) |

(52) U.S. Cl.
CPC ............ *G06V 20/56* (2022.01); *G06V 30/153* (2022.01); *G06V 30/19173* (2022.01); *G06V 30/274* (2022.01); *G06V 30/36* (2022.01); *G06V 30/412* (2022.01); *G06V 30/413* (2022.01); *G06V 30/422* (2022.01); *G06V 30/43* (2022.01)

(58) Field of Classification Search
CPC .................. G06V 10/82; G06V 10/945; G06V 30/19173; G06V 10/22; G06V 30/43; G06V 30/413; G06V 30/422; G06V 20/56
See application file for complete search history.

(56) References Cited

U.S. PATENT DOCUMENTS

2019/0065877 A1\* 2/2019 Kalyuzhny .......... G06V 30/416
2019/0188511 A1\* 6/2019 Kalyuzhny .......... G06V 30/412

OTHER PUBLICATIONS

European Search Report dated Nov. 26, 2021 for Application Serial No. EP21181042.

Notice of Reasons for Refusal of corresponding Japanese Patent Application No. 2021-177859, dated Sep. 2, 2022, 8 pages.

\* cited by examiner

| | | | |
|---|---|---|---|
| 1 | 38·77 | 45693 | 45693.1 |
| 2 | 2999 | 3999 | 5999 |
| 3 | 3999 | 5999 | 5999 |
| 4 | 1427 | 17133 | 24883 |

METHOD AND APPARATUS FOR DIGITIZING PAPER DATA, ELECTRONIC DEVICE AND STORAGE MEDIUM

CROSS-REFERENCE TO RELATED APPLICATION

This application claims priority to Chinese Patent Application No. 202011290842.7, filed on Nov. 17, 2020, which is hereby incorporated by reference in its entirety.

TECHNICAL FIELD

The present application relates to fields of image processing and cloud computing, specifically to image recognition technologies, in particular, to a method and apparatus for digitizing paper data, an electronic device and a storage medium.

BACKGROUND

With the rapid development of computer technology, all walks of life will accumulate a large amount of observation data in daily work, for example, the meteorological observation industry will record a large amount of meteorological data such as air humidity, temperature and atmospheric pressure every day.

These data can be directly recorded in a computer storage system, by which storage and analyzing are easier, however, in the past when computer technology was underdeveloped, respective industries accumulated a large amount of paper data, and in some industries electronic devices are not easy to be introduced in the production environment, and large amounts of non-digitized data are also accumulated, and it is difficult to store this kind of data storage medium, meanwhile, this kind of data storage medium can be easily lost or damaged, and the reading cost is high, while by comparison, calculation and analyzing are difficult.

In the prior art, data digitization is usually carried out by methods of character recognition. However, in much paper data, not only character content is included, but also graphic content is included. However, the solution in the prior art can only recognize the character content, but cannot recognize the graphic content in the paper data.

SUMMARY

The present application provides a method and apparatus for digitizing paper data, an electronic device and a storage medium.

According to a first aspect of the present application, a method for digitizing paper data is provided, including:

determining a standard template according to an image to be processed and mark information corresponding to the image to be processed, where the image to be processed is obtained by photographing paper data and the standard template is used to represent a reference coordinate system of the image to be processed;

recognizing graphic handwriting information included in the image to be processed; and generating digitized data corresponding to the image to be processed according to the graphic handwriting information and the standard template.

According to a second aspect of the present application, an apparatus for digitizing paper data is provided, including:

a template-determining unit, configured to determine a standard template according to an image to be processed and mark information corresponding to the image to be processed, where the image to be processed is obtained by photographing paper data, and the standard template is used to represent a reference coordinate system of the image to be processed;

a recognizing unit, configured to recognize graphic handwriting information included in the image to be processed; and a generating unit, configured to generate digitized data corresponding to the image to be processed according to the graphic handwriting information and the standard template.

According to a third aspect of the present application, an electronic device is provided, including:

at least one processor; and a memory communicatively connected to the at least one processor; wherein, the memory stores instructions executable by the at least one processor, and the instructions are executed by the at least one processor to cause the at least one processor to perform the method for digitizing paper data described in the first aspect.

According to a fourth aspect of the present application, a non-transitory computer-readable storage medium storing computer instructions is provided, the computer instructions are used to cause a computer to perform the method for digitizing paper data described in the first aspect.

According to the method and apparatus for digitizing paper data, electronic device and storage medium provided by the present application, graphic handwriting information included in an image to be processed can be recognized, and such handwriting information can be combined with a reference coordinate system of the image to be processed to obtain digitized data, in this way, paper data can still be converted into digitized data even when graphic data is included in the paper data.

It should be understood that the content described in this section is neither intended to identify key or important features of the embodiments of the present application, nor to limit the scope of the present application. Other features of the present application will become easy to understand through the following description.

BRIEF DESCRIPTION OF DRAWINGS

The appended drawings are for better understanding of the solution and do not constitute a limitation of the present application, wherein:

FIG. 1A is a schematic diagram of paper data according to an illustrative embodiment;

FIG. 4A is a schematic diagram of an image to be processed according to an illustrative embodiment of the present application;

BRIEF DESCRIPTION OF EMBODIMENTS

Illustrative embodiments of the present application are described below with reference to the appended drawings, wherein various details of the embodiments of the present application are included to facilitate understanding, which should be considered as merely illustrative. Therefore, it should be recognized by those of ordinary skill in the art that various changes and modifications can be made to the embodiments described herein without departing from the scope and spirit of the present application. Also, for clarity and conciseness, descriptions of commonly-known functions and structures are omitted in the following description.

In many application scenarios, it is necessary to record observation data; in recent years, the observation data can be stored by a computer system. For example, a database can be built in a computer system, and a user can add data to be recorded in the database.

However, in the past when computer technology was underdeveloped, or when it is inconvenient to use electronic devices, data could only be recorded on paper. Therefore, large amounts of paper data have been accumulated in various industries.

Figure 1B:
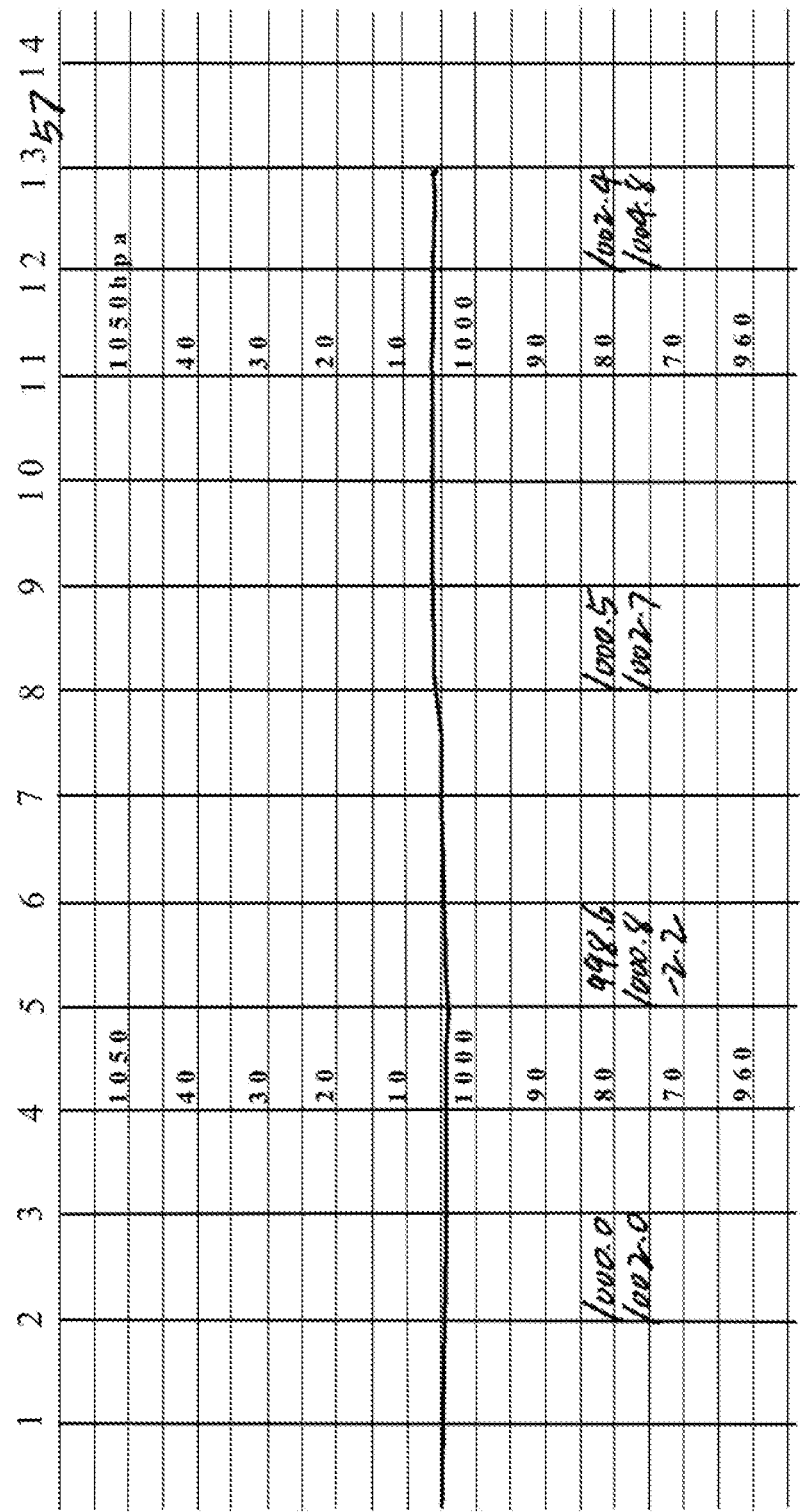
FIG. 1B is a schematic diagram of paper data according to another illustrative embodiment.

FIG. 1A is a schematic diagram of paper data according to an illustrative embodiment; FIG. 1B is a schematic diagram of paper data according to another illustrative embodiment.

As shown in FIG. 1A, in some cases, a user needs to collect and record data, and for some reasons, the data can only be recorded on paper for saving. As paper data is difficult to preserve and can be easily damaged or lost, therefore, this recording method is easy to cause irreparable loss.

Therefore, it is necessary to convert paper data into electronic data.

Figures 2, 3:
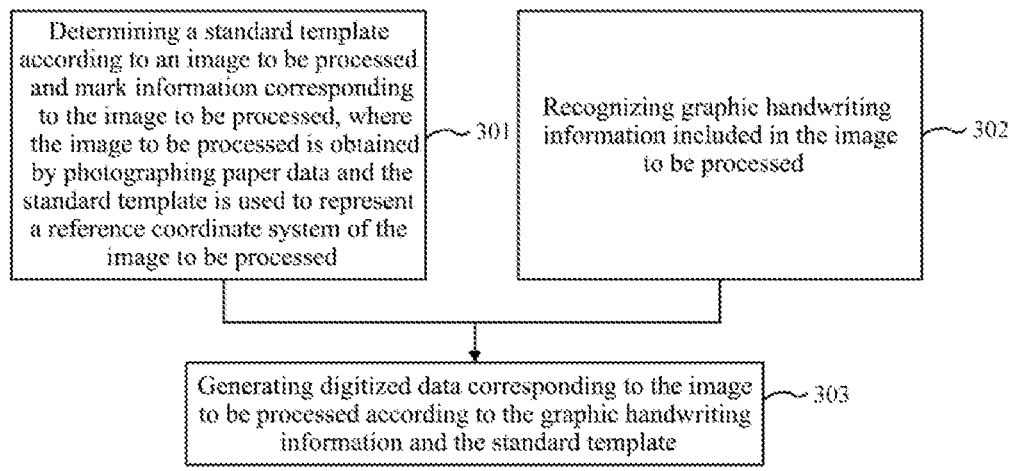
FIG. 2 is a schematic diagram of converting paper data into digitized data according to an illustrative embodiment.
FIG. 3 is a flowchart of a method for digitizing paper data according to an illustrative embodiment of the present application.

FIG. 2 is a schematic diagram of converting paper data into digitized data according to an illustrative embodiment.

As shown in FIG. 2, contents included in paper data 21 can be recognized to obtain digitized data 22.

However, some paper data include not only text content, but also graphic content. Paper data shown in FIG. 1B also include graphic content, and how to accurately recognize the graphic content therein to form digitized data is a technical problem that needs to be solved urgently by those skilled in the art.

The solution provided by the present application is applied to an image recognition technology in the field of image processing to solve the problem that the graphic content in paper data cannot be recognized as digitized data in the prior art.

FIG. 3 is a flowchart of a method for digitizing paper data according to an illustrative embodiment of the present application.

As shown in FIG. 3, the method for digitizing paper data provided by the present application includes:

301, determining a standard template according to an image to be processed and mark information corresponding to the image to be processed, where the image to be processed is obtained by photographing paper data and the standard template is used to represent a reference coordinate system of the image to be processed.

Where the method for digitizing paper data provided by the present application can be performed by an electronic device having computing abilities. The electronic device can be a computer, a tablet computer, a smart phone and other devices.

Specifically, the method provided in the present application can be packaged in software and installed in the electronic device, and the electronic device can perform the method provided in the present embodiment when running the software.

Furthermore, when paper data needs to be converted into digitized data, the paper data can be photographed to obtain an image to be processed. In practical applications, multiple images of paper data can be photographed, and a relatively clear image can be selected as the image to be processed.

In practical applications, the image to be processed can also have mark information.

The mark information can be obtained by marking the image to be processed by a user. For example, the user can mark positioning information in the image to be processed, the positioning information is used to mark a range of data recorded in the image to be processed. The positioning information can also be obtained by recognizing the image to be processed by the electronic device.

Figure 4A:
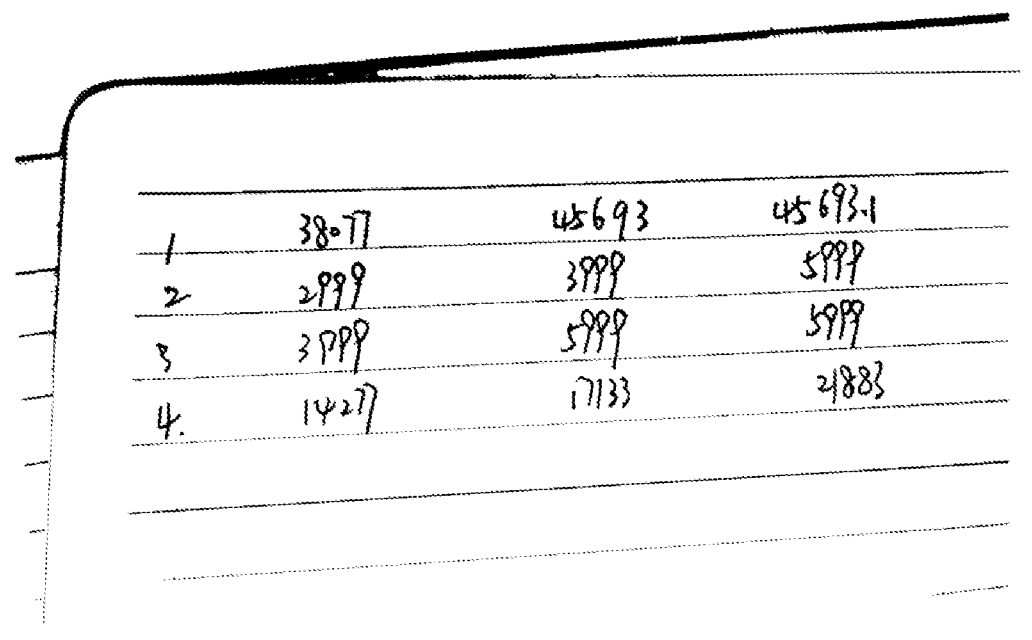

FIG. 4A is a schematic diagram of an image to be processed according to an illustrative embodiment of the present application.

As shown in FIG. 4A, when photographing the paper data, a background image outside the paper data may be photographed, so an area of the paper data can be defined in the image by marking. In some cases, a blank part may also be included in the paper image, and the area including data content may also be defined by marking.

Figure 4B:
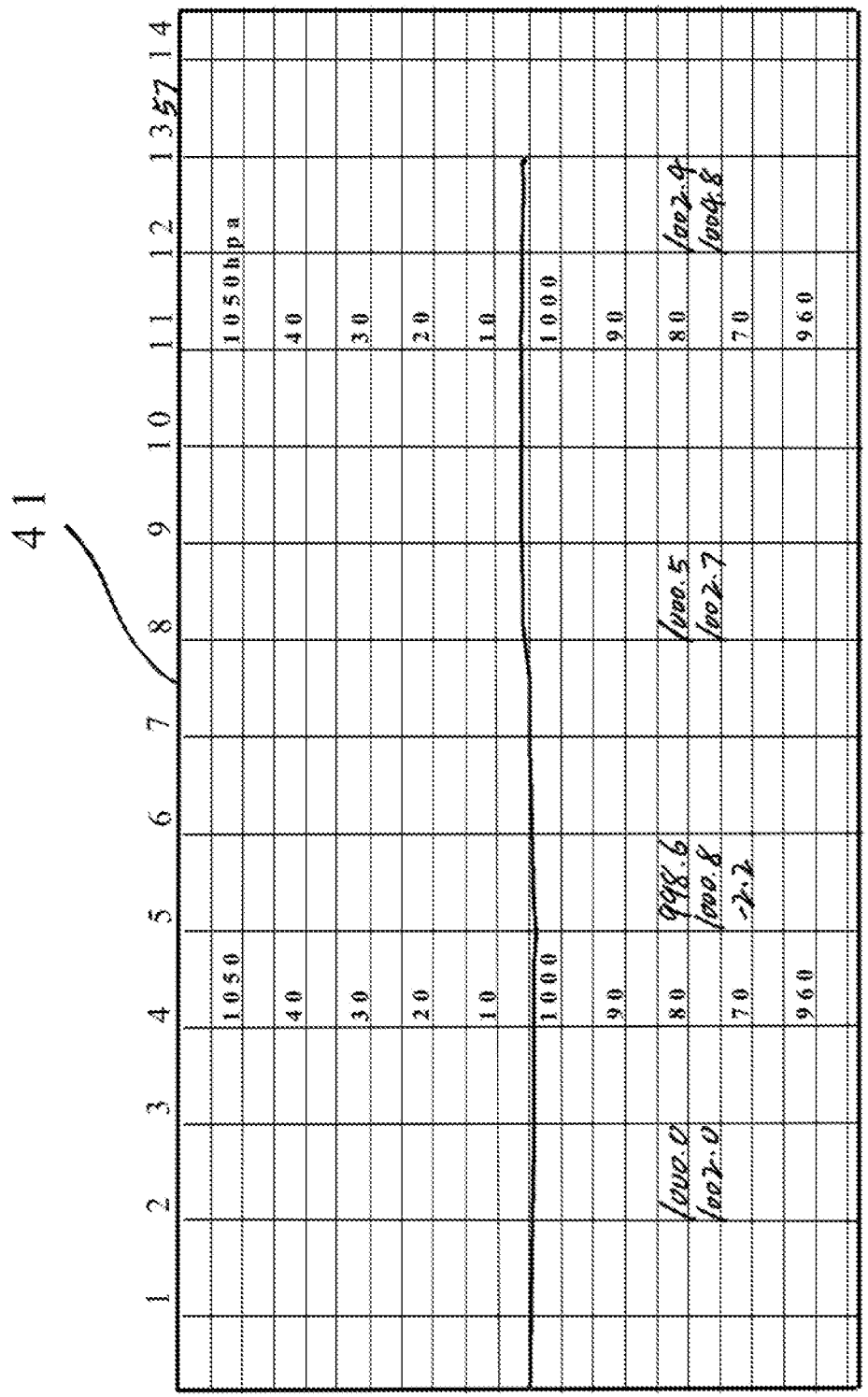
FIG. 4B is a schematic diagram of mark information of an image to be processed according to an illustrative embodiment of the present application.

FIG. 4B is a schematic diagram of mark information of an image to be processed according to an illustrative embodiment of the present application.

As shown in FIG. 4B, a user can mark the image to be processed to obtain a mark box 41, and the electronic device can determine an area where the content to be recognized is located based on the mark box 41. Specifically, the image to be processed can be read by the electronic device, thereby causing the display of the electronic device to display the image to be processed, and the user can perform a marking operation based on the displayed image to be processed.

Where the marking information can also include coordinate system information, for example, a user can mark positions, scales and other information of the coordinate system in the image to be processed. For example, the user can mark a position of abscissa 1 and a position of ordinate 1 in the image to be processed. The coordinate system information can also be obtained by recognizing by a computer, for example, the coordinate system information can be determined by recognizing text content in the image to be processed.

Figure 4C:
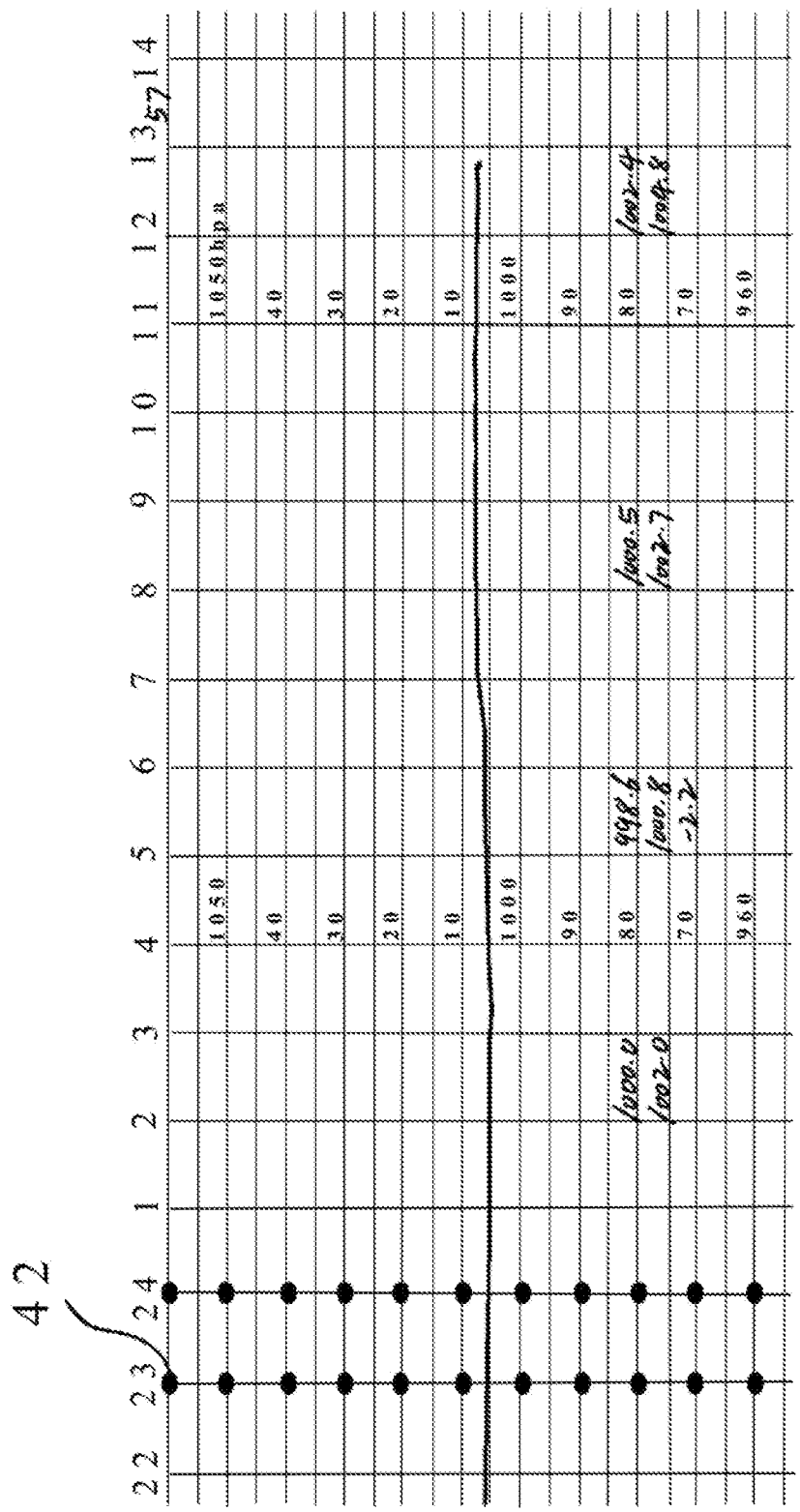
FIG. 4C is a schematic diagram of mark information of an image to be processed according to another illustrative embodiment of the present application.

FIG. 4C is a schematic diagram of mark information of an image to be processed according to another illustrative embodiment of the present application.

As shown in FIG. 4C, a user can mark coordinate point information as shown by points 42 in the image to be processed.

Where the electronic device can determine the standard template according to the image to be processed and its mark information. Specifically, a target area to be recognized can be determined according to positioning information, and a coordinate system can be generated according to the coordinate system information. The electronic device can generate a standard template according to the target area and the generated coordinate system. The size of the standard template is consistent with the target area, and the standard template is used to represent a reference coordinate system of the image to be processed.

Specifically, the electronic device can also generate a standard template corresponding to the image to be processed according to the image to be processed and its corresponding coordinate system information. Specifically, the coordinate system can be generated according to the coordinate system information, and then the standard template can be generated according to the coordinate system.

Figure 4D:
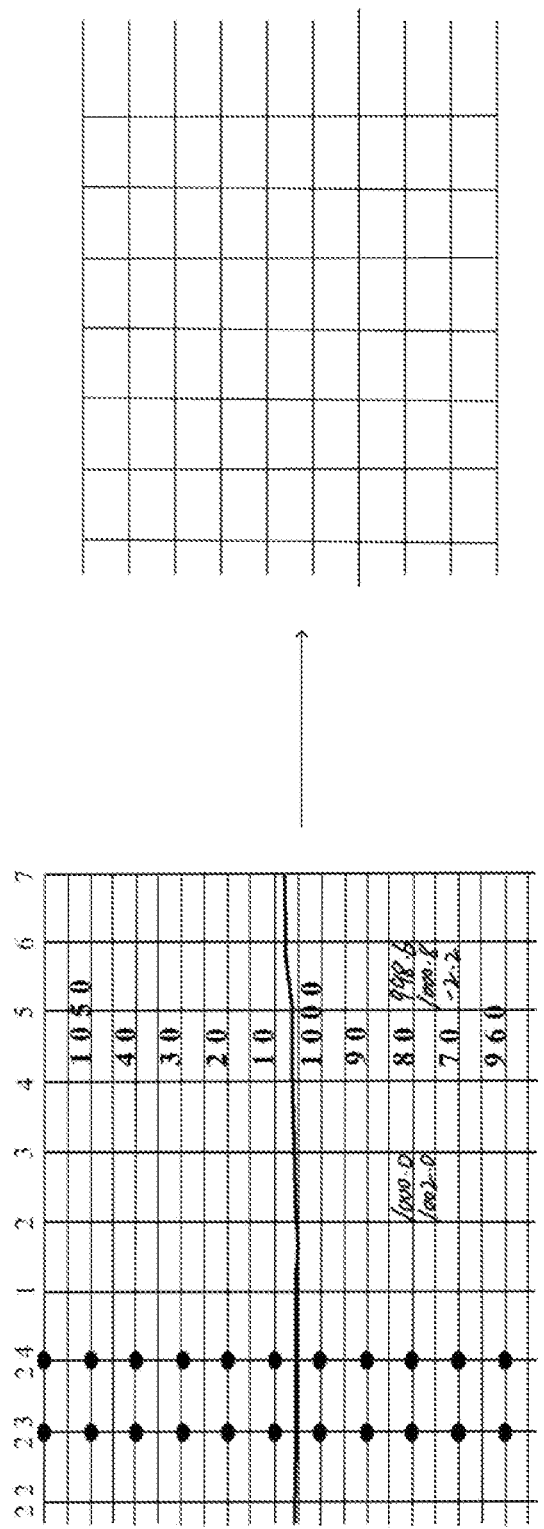
FIG. 4D is a schematic diagram of a standard template according to an illustrative embodiment of the present application.

FIG. 4D is a schematic diagram of a standard template according to an illustrative embodiment of the present application.

As shown in FIG. 4D, the image to be processed and its mark information are shown on the left side, and a determined standard template is shown on the right side.

302, recognizing graphic handwriting information included in the image to be processed.

An execution order of 302 and 301 is not limited.

The graphic handwriting information refers to graphic handwriting included in the paper data, such as curves and histograms in the paper data. In some scenarios, after collecting data, the user will mark the collected data in the coordinate system and express the collected data graphically.

Specifically, the electronic device can recognize the graphic handwriting included in the image to be processed. Furthermore, if the marking information includes positioning information, the electronic device can also recognize the graphic handwriting information within the area defined by the positioning information.

Figure 4E:
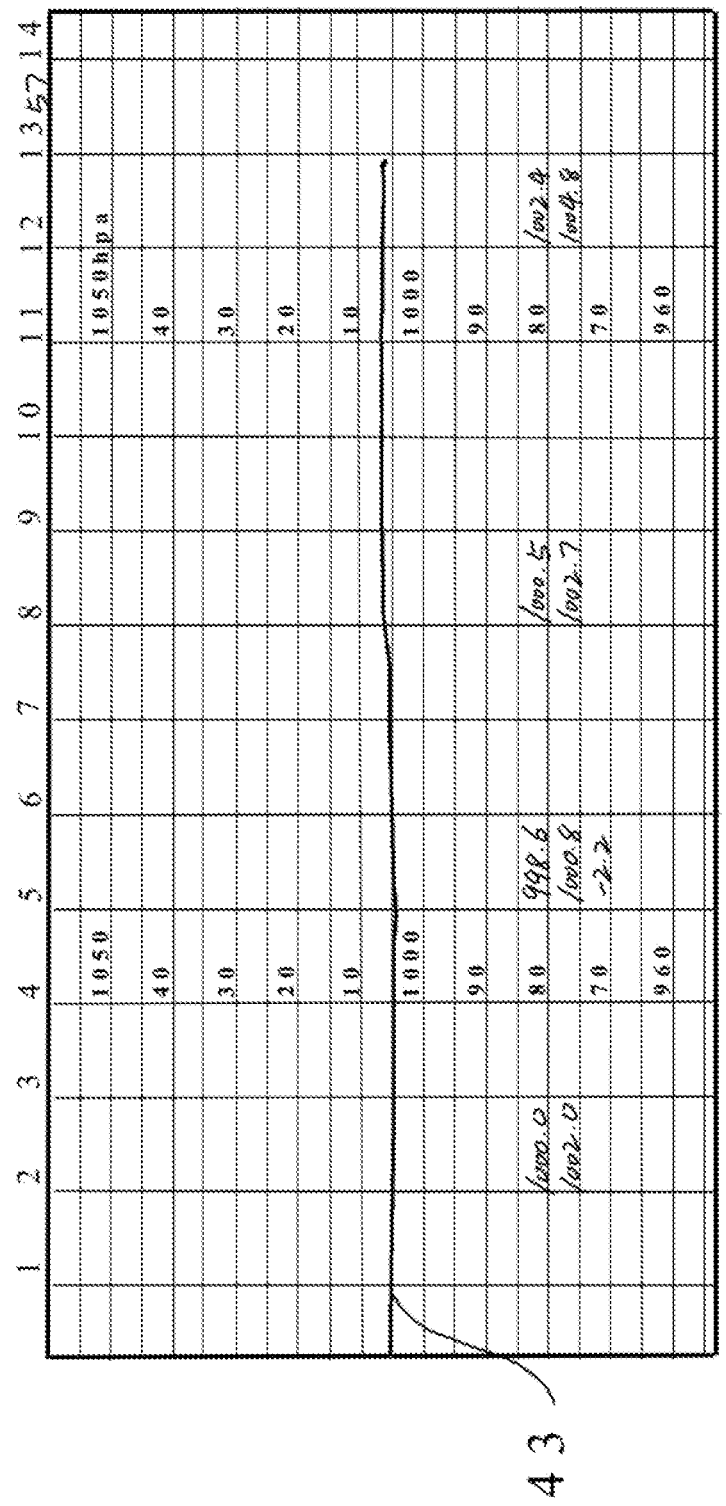
FIG. 4E is a schematic diagram of recognizing graphic handwriting information in an image to be processed according to an illustrative embodiment of the present application.

FIG. 4E is a schematic diagram of recognizing graphic handwriting information in an image to be processed according to an illustrative embodiment of the present application.

As shown in FIG. 4E, the electronic device can recognize the graphic handwriting 43 in the image to be processed.

Furthermore, a recognition model for recognizing the graphic handwriting can be trained in advance. For example, a neural network model can be built, and then some image data for training can be prepared, and the graphic handwriting included in the image data can be marked, and the network model can be trained by using the marked data, thereby obtaining a recognition model that can recognize graphic handwriting.

The trained model can be set in the electronic device. When the graphic handwriting information is being recognized, the image to be recognized can be inputted into the recognition model, and then the model outputs a recognition result, that is, the graphic handwriting information included in the image to be processed.

303, generating digitized data corresponding to the image to be processed according to the graphic handwriting information and the standard template.

In practical applications, after the electronic device determines the standard template corresponding to the image to be processed and recognizes the graphic handwriting information included in the image to be processed, digitized data can be generated according to the graphic handwriting information and the standard template.

Where the electronic device can splice the graphic handwriting information into the standard template, so as to obtain an initial digitized table. For example, the graphic handwriting information can include the graphic handwriting per se and a position of the graphic handwriting in the image to be processed, and then based on the position information, the graphic handwriting can be drawn into the standard template to obtain the initial digitized table.

In an optional embodiment, after the electronic device recognizes the graphic handwriting, the graphic handwriting can be displayed on a display, for example, the graphic handwriting can be highlighted in the image to be processed. The user can mark matching points corresponding to a reference coordinate system in the standard template in the graphic handwriting. For example, the user can click a point in the graphic handwriting and click the corresponding position in the standard template based on the coordinate value corresponding to the point.

In practical applications, one set of matching points can be marked, or multiple sets of matching points can also be marked.

Where the electronic device can draw the graphic handwriting into the standard template according to the corresponding relationship between the matching points, so as to obtain the initial digitized table.

In one implementation, the initial digitized table can be taken as the digitized data corresponding to the image to be processed.

In another implementation, the initial digitized table can be further processed. For example, according to a position of the graphic handwriting in the standard template and a reference coordinate system in the standard template, numerical values corresponding to respective pixels in the graphic handwriting can be read, these numerical values can be stored to obtain digitized data.

The present application provides a method for digitizing paper data, including determining a standard template according to an image to be processed and mark information corresponding to the image to be processed, the image to be processed being obtained by photographing paper data, the standard template being used to represent a reference coordinate system of the image to be processed; recognizing graphical handwriting information included in the image to be processed; and generating digitized data corresponding to the graphical handwriting information and the standard template. According to the method for digitizing paper data provided by the present application, graphic handwriting information included in an image to be processed can be recognized, and the handwriting information can be combined with a reference coordinate system of the image to be processed to obtain digitized data, in this way, paper data can still be converted into digitized data even when graphic data is included in the paper data.

Figure 5:
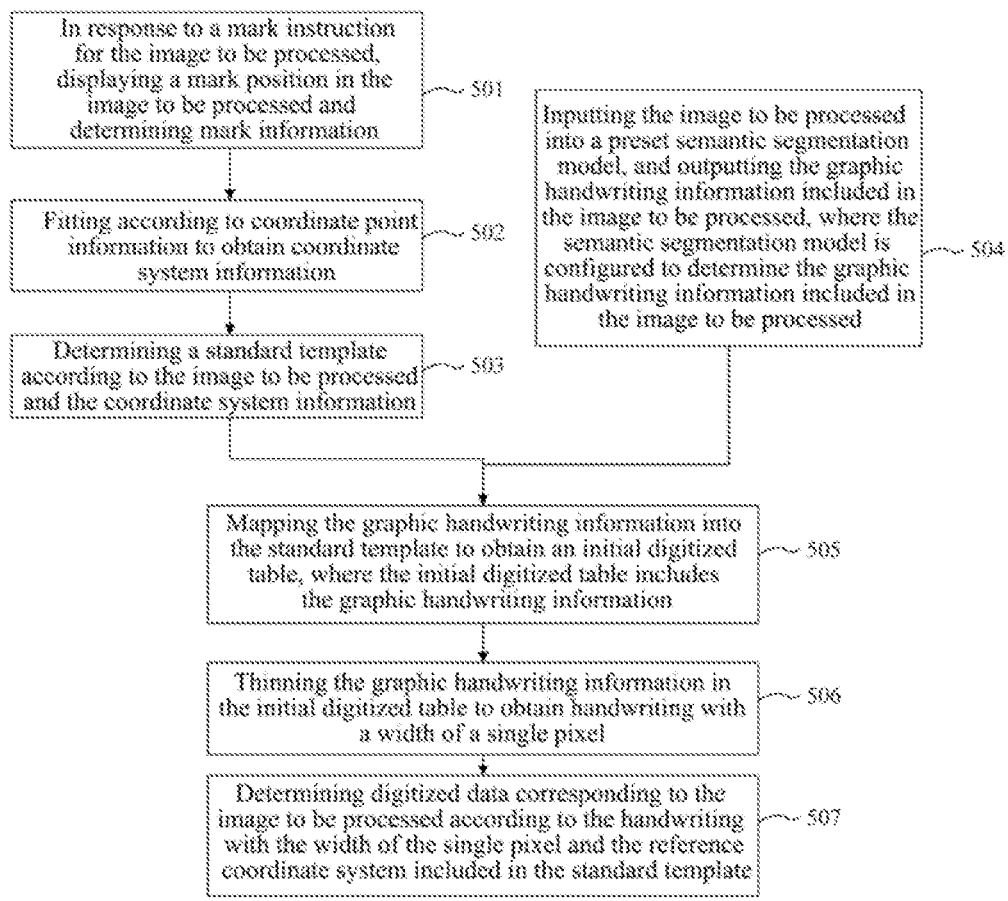
FIG. 5 is a flowchart of a method for digitizing paper data according to another illustrative embodiment of the present application.

FIG. 5 is a flowchart of a method for digitizing paper data according to another illustrative embodiment of the present application.

As shown in FIG. 5, the method for digitizing paper data provided by the embodiment of the present application includes:

501, in response to a mark instruction for the image to be processed, displaying a mark position in the image to be processed and determining the mark information.

Where the method for digitizing paper data provided by the present application can be performed by an electronic device having computing abilities. The electronic device can be a computer, a tablet computer, a smart phone and other devices.

Specifically, the method provided in the present application can be packaged in software and installed in the electronic device, and the electronic device can perform the method provided in the present embodiment when running the software.

Furthermore, when paper data needs to be converted into digitized data, the paper data can be photographed and a relative clear image can be taken as the image to be processed.

In practical applications, the image to be processed can be imported into an electronic device and displayed on a display of the electronic device.

Where a user can operate the electronic device to send a mark instruction to mark the image to be processed. After receiving the mark instruction, in response to the mark instruction, the electronic device can display the mark position and determine the mark information in the image to be processed. For example, the user can click a position to be marked on the screen, and the electronic device can display the marking point at the corresponding position and record the marking position.

Specifically, when the mark instruction is a positioning point mark instruction, the mark information determined by the electronic device is positioning point information. When the electronic device displays the image to be processed, the user can send a positioning point mark instruction to the electronic device, for example, click an option of "mark positioning points" and click in the image to be processed, and the electronic device can display the positioning point at the clicked position and determine the positioning point information.

In one implementation, the electronic device can correct the image to be processed according to the positioning information, for example, the image to be processed can be made upright by rotating.

Furthermore, the positioning point information includes a frame positioning point of the image to be processed, and the frame positioning point is used to define a range of the standard template. The electronic device can take a position clicked by the user as a frame positioning point, and an area framed by multiple frame vertexes is taken as a range of the standard template. For example, a user can click on four corner points of an area with handwriting content in the image to be processed, and the electronic device can take the four corner points as frame positioning points, and a rectangle framed by the four corner points is used to define the range of the standard template.

In this implementation, a part of the image to be processed that has no need to be recognized can be removed, thereby reducing the calculation amount of the electronic device.

Figure 6A:
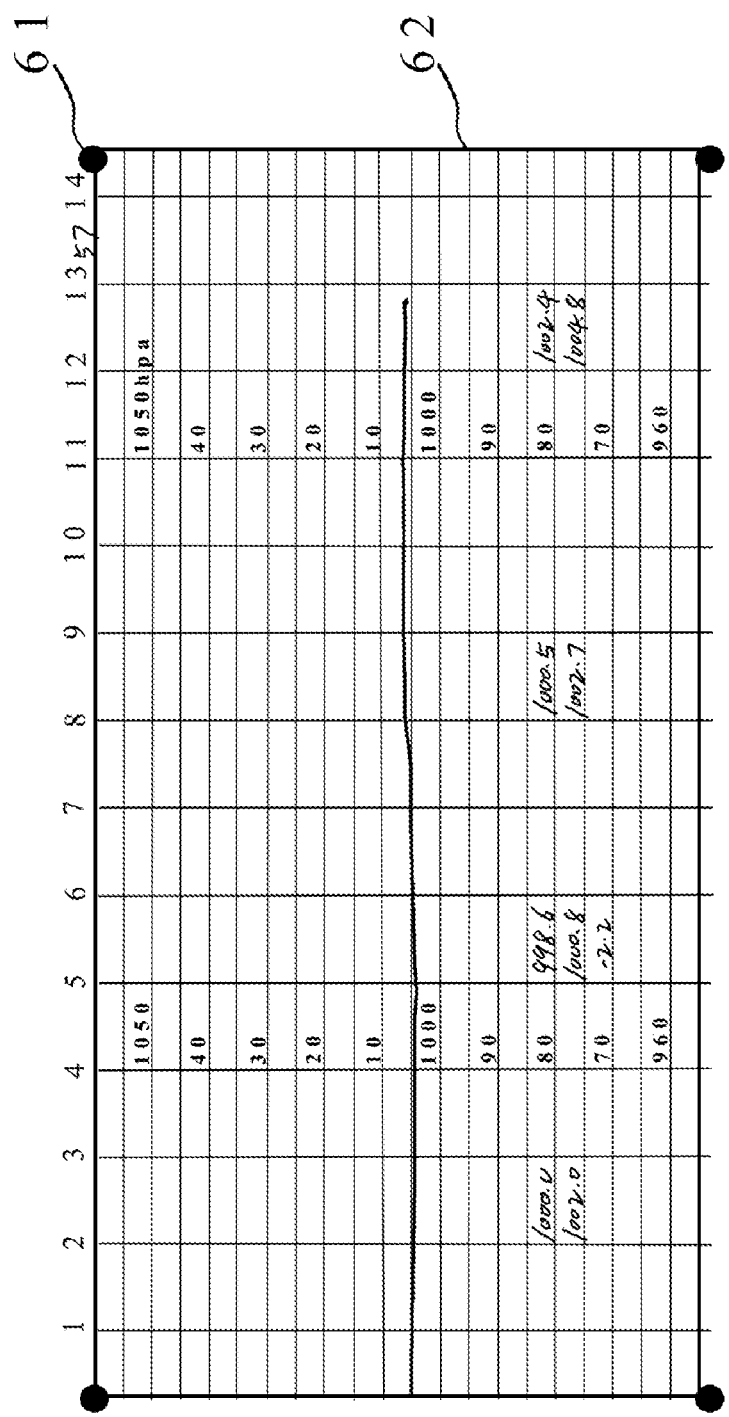
FIG. 6A is a schematic diagram of marking positioning points in an image to be processed according to an illustrative embodiment of the present application.

FIG. 6A is a schematic diagram of marking positioning points in an image to be processed according to an illustrative embodiment of the present application.

As shown in FIG. 6A, a user can mark positioning points 61 in the image to be processed, and the electronic device takes the four positioning points 61 as frame positioning points, and a rectangular frame 62 framed by the positioning points 61 is taken as a range of the standard template.

Furthermore, when the mark instruction is a coordinate point mark instruction, the mark information determined by the electronic device is coordinate point information. When the electronic device displays the image to be processed, a user can send a coordinate point mark instruction to the electronic device, for example, click an option of "marking coordinate points", then click a position to be marked in the image to be processed and set a coordinate value corresponding to the position, and the electronic device can display the coordinate point at the clicked position and determine the coordinate point information.

In the embodiment, key information in the image can be determined by the user's operation, and the key information in the image can be accurately obtained through the method which is based on the user's designation. Specifically, by interacting with a user, when the user designates the positioning point and/or the coordinate point, the electronic device can obtain the accurate positioning point and/or the accurate coordinate point without wasting resources to recognize the key information.

502, fitting according to the coordinate point information to obtain coordinate system information.

In practical applications, the mark information obtained by marking the image to be processed can include coordinate point information. The electronic device can fit the coordinate point information to obtain the coordinate system information.

For example, coordinate points with the same abscissa can be made consistent in a horizontal direction and coordinate points with the same ordinate can be made consistent in a vertical direction. Other data information can be completed in positions where no coordinate point is marked. For example, other scale values are completed between scales 1 and 5.

503, determining a standard template according to the image to be processed and the coordinate system information.

Where the electronic device can generate the standard template according to obtained coordinate system information. Specifically, the range of the coordinate system can be demarcated according to the image to be processed, and a range of the coordinate system equivalent to the size of the image to be processed can be taken as a standard template.

Specifically, the range of the coordinate system can also be determined and demarcated according to a relative position of the marked coordinate point information in the image to be processed. For example, a coordinate point (1,0) is marked in the image to be processed, the coordinate point (1,0) is at a starting position of the coordinate system in the image, then the coordinate point (1,0) will also be taken as a starting position of the template when the standard template is generated according to the coordinate system information.

Furthermore, if positioning point information is also marked in the image to be processed when marking, the standard template can also be determined by combining the positioning point information and the coordinate system information in the image to be processed.

For example, the positioning point information can be taken as frame vertexes, an area in the coordinate system is framed as the standard template.

In the implementation, the marked coordinate point information can be fitted to obtain accurate coordinate information, so that the standard template can accurately represent the reference coordinate system in the image to be processed.

504, inputting the image to be processed into a preset semantic segmentation model, and outputting graphic handwriting information included in the image to be processed, where the semantic segmentation model is configured to determine the graphic handwriting information included in the image to be processed.

In practical applications, an execution order of 504 and 501-503 is not limited.

Where the semantic segmentation model for recognizing the graphic handwriting information included in the image can be trained in advance and set in the electronic device.

Specifically, the image to be processed can be inputted into the preset semantic segmentation model, and the preset semantic segmentation model can recognize the image to be processed and output the graphic handwriting information included therein.

Furthermore, the semantic segmentation model can be a full convolution neural network structure that can perform convolution calculation on an input image, and then determine a first probability value that a respective pixel in the image belongs to the graphic handwriting, and also determine a second probability value that a respective pixel in the image does not belong to the graphic handwriting.

In practical applications, the semantic segmentation model can determine whether a pixel belongs to the graphic handwriting according to the first probability value and/or the second probability value. For example, if the first probability value of a pixel is relatively high and the second probability value is relatively low, it can be considered that the pixel belongs to the graphic handwriting.

Where the semantic segmentation model can set pixels belonging to the graphic handwriting as 1, and pixels not belonging to graphic handwriting as 0, so as to obtain a mask of the graphic handwriting, and the pixels with a value of 1 in the mask are connected to form the graphic handwriting information.

Where an image for training a model can be prepared in advance. The training image may include the graphic handwriting, such as curves, histograms, pie charts, or the like drawn by the user. The graphic handwriting in the image can be marked in advance to form a label of the training image.

Specifically, a neural network model can be built in advance, and the training image with the label can be inputted into the model. The model can output a recognition result by processing the training image, compare the recognition result with the label of the training image, and perform backward propagation to adjust a parameter in the model. The parameter in the model is optimized by multiple times of iterative forward propagation and backward propagation.

Furthermore, when errors between the output result of the neural network model and the label of the training image satisfies a preset threshold, the training can be stopped, and a model for image recognition is obtained.

The model that can be trained using this method can recognize the graphic handwriting included in the image, so that the graphic handwriting included in the image can be extracted to form digitized data.

In an optional implementation, the neural network model includes a first preset number of down-sampling layers, a second preset number of up-sampling layers and a classification layer. For example, 8 down-sampling layers, 8 up-sampling layers and a classification layer can be included. The down-sampling layer can extract high-level semantic information of the image to obtain a feature map, and the up-sampling layer further restores the feature map to a size as same as the original image, and finally obtains a pixel-level classification result with a size as same as the original image.

In an optional implementation, each down-sampling layer includes: a first convolution layer, a first batch of normalization layers, a first activation layer and a maximum pooling layer.

Where the convolution kernel of the first convolution layer is 3*3 and the step size is 1. The core of the maximum pool layer is 2*2, and the step size is 1.

The up-sampling layer includes: a 2× (double) up-sampling layer, a second convolution layer, a second batch of normalization layers and a first activation layer. Where the convolution kernel of the second convolution layer is 3*3 and the step size is 1.

The classification layer is a third convolution layer.

Through the neural network model, the graphic handwriting information included in the image to be processed can be accurately recognized.

Figure 6B:
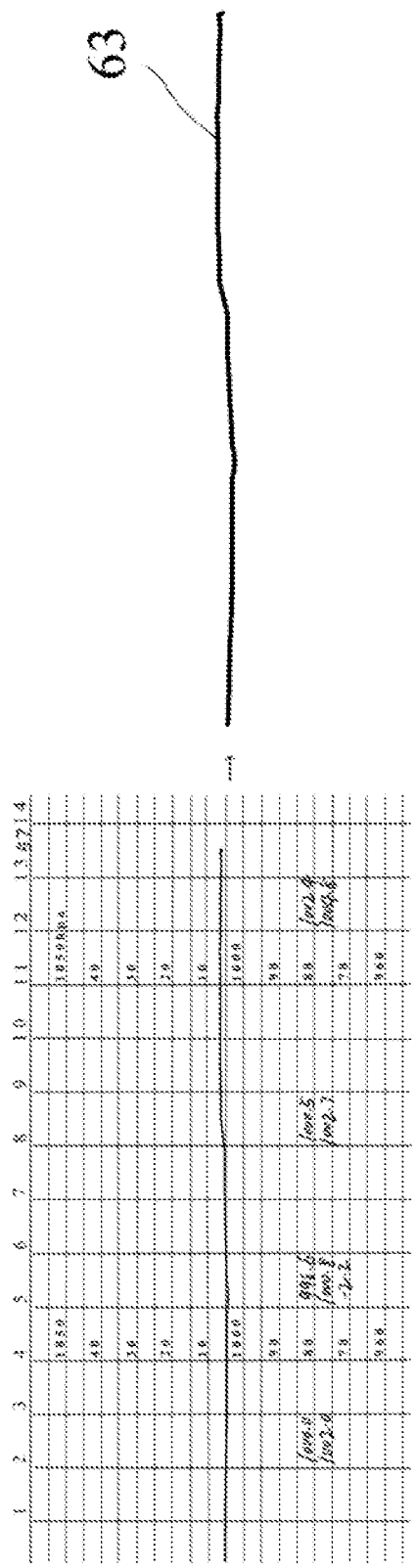
FIG. 6B is a schematic diagram of recognizing graphic handwriting in an image to be processed according to an illustrative embodiment of the present application.

FIG. 6B is a schematic diagram of recognizing graphic handwriting in an image to be processed according to an illustrative embodiment of the present application.

As shown in FIG. 6B, the image to be processed inputted into the semantic segmentation model is shown on the left side, where 63 is the graphic handwriting information recognized therein, which is in a form of mask.

Specifically, a specific graphic form can be set according to requirements, for example, if curved graphic handwriting needs to be recognized, a preset segmentation model can be trained to recognize the graphic handwriting included in the image. Correspondingly, after the image to be processed is inputted into the preset semantic segmentation model, the preset semantic segmentation model can output the graphic handwriting information included in the image to be processed.

Further, the preset semantic segmentation model is specifically configured to:

determine a first probability value that a respective pixel in the image to be processed belongs to the graphic handwriting and/or a second probability value that a respective pixel in the image to be processed does not belong to the graphic handwriting; determine whether the pixel belongs to the graphic handwriting according to the first probability value and/or the second probability value; and determine the graphic handwriting information according to pixels belonging to the graphic handwriting.

In the implementation, the image to be processed can be recognized pixel by pixel, thereby realizing comprehensive and accurate recognition of the graphic handwriting included in the image.

505, mapping the graphic handwriting information into the standard template to obtain an initial digitized table, where the initial digitized table includes the graphic handwriting information.

In practical applications, after 503 and 504, the solution provided by the present application can also generate an initial digitized table according to the graphic handwriting information and the standard template.

In one implementation, the graphic handwriting can be mapped to the standard template according to a position of the graphic handwriting in the image to be processed. For example, the graphic handwriting is in the middle of the area framed by the positioning points, then the graphic handwriting can be mapped to the middle of the standard template.

In another implementation, if the mark information obtained by marking the image to be processed includes the positioning point information, then, in response to the marking operation to the graphic handwriting information, a matching position corresponding to the positioning point in the standard template can be determined in the graphic handwriting information; and the graphic handwriting information is mapped, according to a corresponding relationship between the positioning point information and the matching position, into the standard template to obtain the initial digitized table.

If the standard template is determined based on the positioning point information, the positioning point information may also be included in the standard template.

Specifically, the graphic handwriting information can be in a form of mask, and the mask includes values of 0 and 1, pixels with value 1 belong to the graphic handwriting, and pixels with value 0 do not belong to the graphic handwriting.

In this case, a user can send to the electronic device an instruction for performing a mark operation on the graphic handwriting information, so as to mark a matching position corresponding to the positioning point information in the standard template in the graphic handwriting information. For example, the electronic device can display the mask of the graphic handwriting on the standard template, and the user can move the mask of the graphic handwriting and mark the matching position corresponding to the positioning point information in the standard template. The electronic device can match the positioning point in the template with the marked position in the mask of the graphic handwriting by affine transformation, perspective transformation or the like based on the corresponding relationship between the positioning point information and the matching position, so as to map the mask of the graphic handwriting to the standard template and obtain the initialized digital table.

In the implementation, the matching process between the graphic handwriting information and the standard template can be implemented based on user interaction, so that the graphic handwriting can be "transplanted" into the standard template.

In another optional implementation, in response to a matching operation for the graphic handwriting information and the standard template, a first matching position can be determined in the graphic handwriting information, and a second matching position can be determined in the standard template, where the first matching position corresponds to the second matching position; and the graphic handwriting information is mapped, according to a corresponding relationship between the first matching position and the second matching position, into the standard template to obtain the initial digitized table.

In this implementation, a user can send to the electronic device a matching instruction for matching the graphic handwriting information with the standard template, and mark a first matching position in the graphic handwriting information, and mark a second matching position in the standard template, and the electronic device can display and determine that the first matching position and the second matching position have a corresponding relationship.

Where the user can mark a plurality of groups of corresponding first matching position and second matching position. The electronic device can map, according to the corresponding relationship between the first matching position and the second matching position, the graphic handwriting information into the standard template to obtain the initial digitized table.

In the implementation, the matching process between the graphic handwriting information and the standard template can be implemented based on user interaction, so that the graphic handwriting can be "transplanted" into the standard template.

506, thinning the graphic handwriting information in the initial digitized table to obtain handwriting with a width of a single pixel.

Specifically, the recognized graphic handwriting information is a trace drawn artificially in the image to be processed, so a thickness of the recognized graphic handwriting is related to strokes in the paper data. Generally speaking, handwriting made artificially is thicker, so it is necessary to thin the handwriting to get handwriting with a width of a single pixel.

Further, the graphic handwriting information in the initial digitized table can be processed based on a skeleton extraction algorithm to obtain the handwriting with the width of the single pixel.

When recognizing numerical values corresponding to the graphic handwriting, it is more accurate to perform the recognition on handwriting with the width of the single pixel.

Figure 6C:
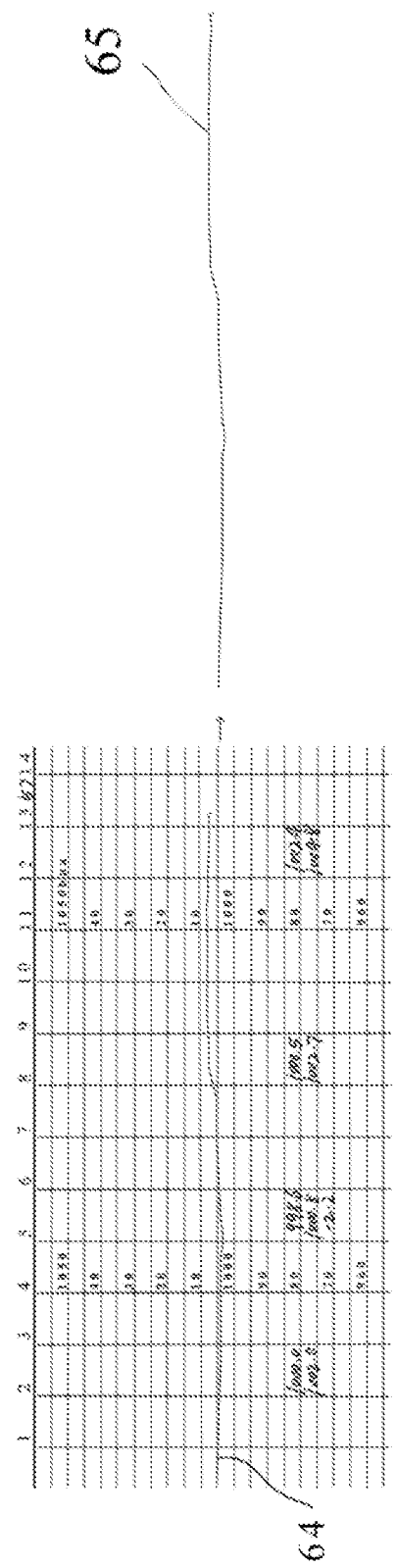
FIG. 6C is a schematic diagram of handwriting with a width of a single pixel according to an illustrative embodiment of the present application.

FIG. 6C is a schematic diagram of handwriting with a width of a single pixel according to an illustrative embodiment of the present application.

As shown in FIG. 6C, there is graphic handwriting 64 in the initial digitized table, the graphic handwriting 64 can be thinned to obtain handwriting as shown in 65.

507, determining the digitized data corresponding to the image to be processed according to the handwriting with the width of the single pixel and the reference coordinate system included in the standard template.

In practical applications, the reference coordinate system is included in the standard template, therefore, the reference coordinate system can be taken as a scale reference, and numerical information corresponding to each pixel in the handwriting can be determined according to the handwriting with the width of the single pixel and a prime reference coordinate system included in the standard template. For example, a pixel can correspond to an abscissa and an ordinate.

In the implementation, a plurality of numerical values corresponding to graphic handwriting can be recognized, so that paper data can be converted into digitized data.

Where the digitized data corresponding to the image to be processed can be determined according to the numerical information corresponding to each pixel. For example, the numerical value corresponding to each pixel can be stored to form digitized data. Therefore, according to the method provided by the present application, paper data can be converted into digitized data.

Figure 7:
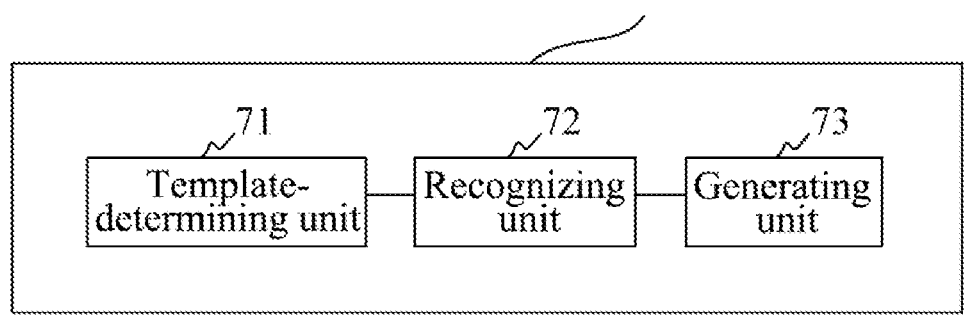
FIG. 7 is a structural diagram of an apparatus for digitizing paper data according to an illustrative embodiment of the present application.

FIG. 7 is a structural diagram of an apparatus for digitizing paper data according to an illustrative embodiment of the present application.

As shown in FIG. 7, the apparatus for digitizing paper data provided by the present application includes:

a template-determining unit 71, configured to determine a standard template according to an image to be processed and mark information corresponding to the image to be processed, where the image to be processed is obtained by photographing paper data, and the standard template is used to represent a reference coordinate system of the image to be processed;

a recognizing unit 72, configured to recognize graphic handwriting information included in the image to be processed; and a generating unit 73, configured to generate digitized data corresponding to the image to be processed according to the graphic handwriting information and the standard template.

The specific principle, effect and implementation of the apparatus for digitizing paper data provided in the present embodiment are similar to the embodiment shown in FIG. 3, and will not be described in detail here.

Figure 8:
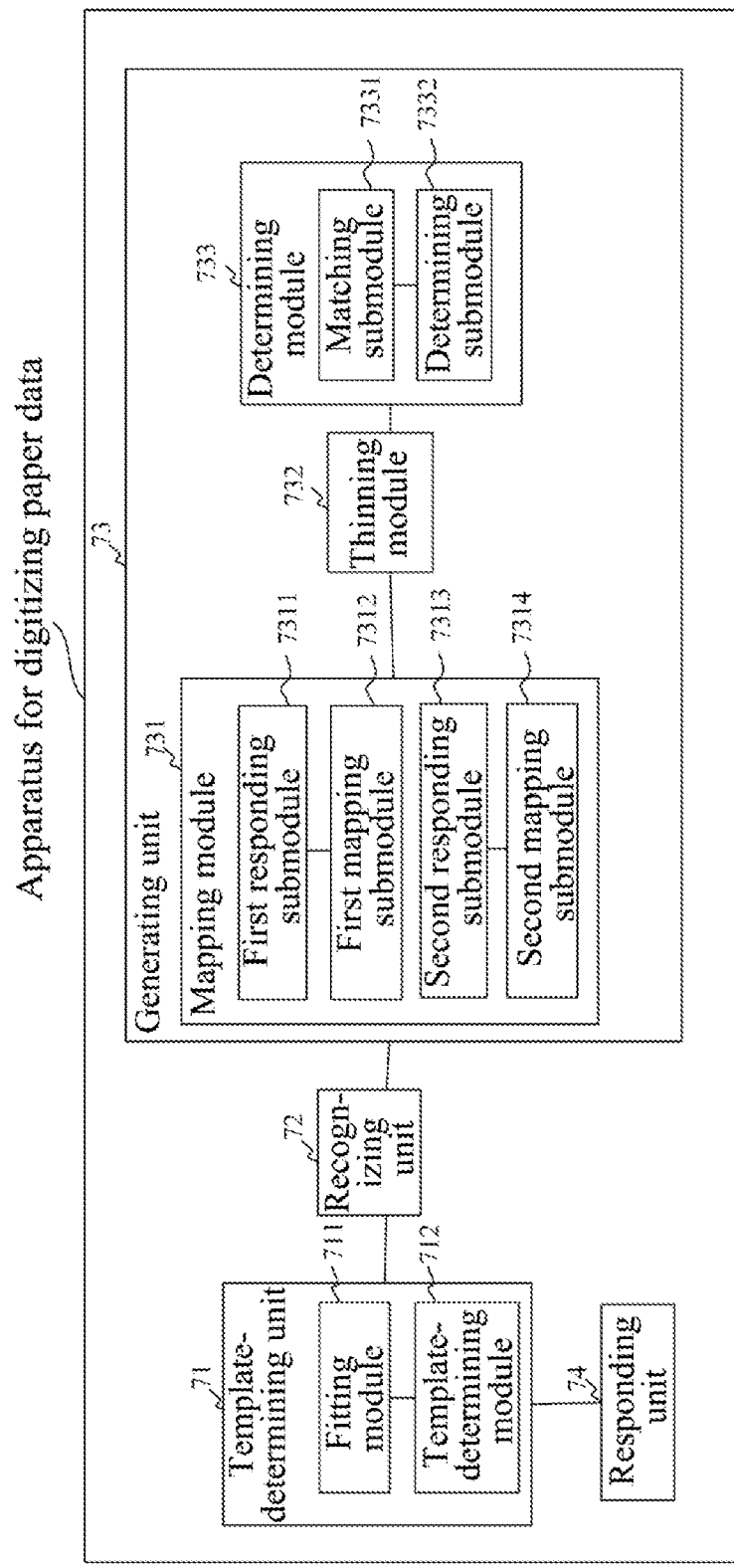
FIG. 8 is a structural diagram of an apparatus for digitizing paper data according to another illustrative embodiment of the present application.

FIG. 8 is a structural diagram of an apparatus for digitizing paper data according to another illustrative embodiment of the present application.

On the basis of the above embodiments, the apparatus for digitizing paper data provided in the present application, the mark information includes coordinate point information, and the template-determining unit 71 includes:

a fitting module 711, configured to fit according to the coordinate point information to obtain coordinate system information; and a template-determining module 712, configured to determine the standard template according to the image to be processed and the coordinate system information.

Optionally, the apparatus further includes a responding unit 74, configured to, before the template-determining unit 71 determines the standard template according to the image to be processed and the mark information corresponding to the image to be processed:

in response to a mark instruction for the image to be processed, display a mark position in the image to be processed and determine the mark information.

Optionally, the mark instruction includes a positioning point mark instruction and the mark information includes positioning point information; and/or, the mark instruction includes a coordinate point mark instruction, and the mark information includes coordinate point information.

Optionally, the positioning point information includes a frame positioning point of the image to be processed, and the frame positioning point is used to define a scope of the standard template.

Optionally, the recognizing unit 72 is specifically configured to:

input the image to be processed into a preset semantic segmentation model, output the graphic handwriting information included in the image to be processed, where the semantic segmentation model is configured to determine the graphic handwriting information included in the image to be processed.

Optionally, the preset semantic segmentation model is specifically configured to:

determine a first probability value that a respective pixel in the image to be processed belongs to graphic handwriting and/or a second probability value that a respective pixel in the image to be processed does not belong to graphic handwriting;

determine whether the pixel belongs to the graphic handwriting according to the first probability value and/or the second probability value; and determine the graphic handwriting information according to pixels belonging to the graphic handwriting.

Optionally, the generating unit 73 includes:

a mapping module 731, configured to map the graphic handwriting information into the standard template to obtain an initial digitized table, where the initial digitized table includes the graphic handwriting information;

a thinning module 732, configured to thin the graphic handwriting information in the initial digitized table to obtain handwriting with a width of a single pixel; and a determining module 733, configured to determine the digitized data corresponding to the image to be processed according to the handwriting with the width of the single pixel and the reference coordinate system included in the standard template.

Optionally, the mark information includes positioning point information, and the standard template includes the positioning point information;

the mapping module 731 includes:

a first responding submodule 7311, configured to in response to a mark operation to the graphic handwriting information, determine a matching position corresponding to the positioning point information in the standard template in the graphic handwriting information; and a first mapping submodule 7312, configured to map, according to a corresponding relationship between the positioning point information and the matching position, the graphic handwriting information into the standard template to obtain an initial digitized table.

Optionally, the mapping module 731 includes:

a second responding submodule 7313, configured to in response to a matching operation to the graphic handwriting information and the standard template, determine a first matching position in the graphic handwriting information, and determine a second matching position in the standard template, where the first matching position corresponds to the second matching position; and a second mapping module 7314, configured to map, according to a corresponding relationship between the first matching position and the second matching position, the graphic handwriting information into the standard template to obtain an initial digitized table.

Optionally, the thinning module 732 is specifically configured to:

process the graphic handwriting information in the initial digitized table based on a skeleton extraction algorithm to obtain the handwriting with the width of the single pixel.

Optionally, the determining module 733 includes:

a matching submodule 7331, configured to determine numerical information corresponding to each pixel in the handwriting according to the handwriting with the width of the single pixel and a prime reference coordinate system included in the standard template; and a determining submodule 7332, configured to determine the digitized data corresponding to the image to be processed according to the numerical information.

The specific principle, effect and implementation of the apparatus for digitizing paper data provided in the present embodiment are similar to the embodiment shown in FIG. 5, and will not be described in detail here.

According to the embodiment of the present application, the present application also provides an electronic device and a readable storage medium.

Figure 9:
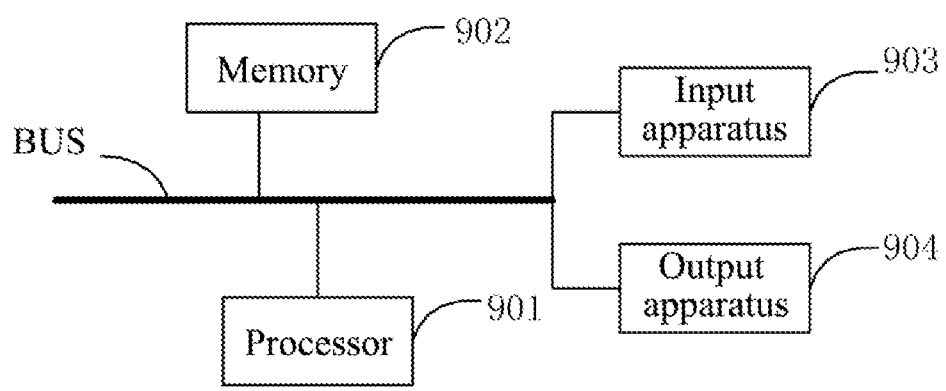
FIG. 9 is a block diagram of an electronic device according to an illustrative embodiment of the present application.

As shown in FIG. 9, FIG. 9 is a block diagram of an electronic device according to the method for digitizing paper data of the embodiment of the present application. The electronic device is intended to represent various forms of digital computers, such as laptop computers, desktop computers, workstations, personal digital assistants, servers, blade servers, mainframe computers, and other suitable computers. The electronic device can also represent various forms of mobile devices, such as personal digital processing, cellular phones, smart phones, wearable devices and other similar computing devices. The components, their connections and relationships, and their functions shown herein are merely examples, and are not intended to limit the implementation of the application described and/or claimed herein.

As shown in FIG. 9, the electronic device includes: one or more processors 901, a memory 902, and interfaces configured to connect various components, including high-speed interfaces and low-speed interfaces. The various components are connected to each other by using different buses, and can be installed on a common main board or in other methods according to requirements. The processor may process instructions executed in the electronic device, including instructions stored in or on the memory to display graphical information of the GUI on an external input/output device, such as a display device coupled to an interface. In other embodiments, multiple processors and/or multiple buses may be used together with multiple memories, if needed. Similarly, multiple electronic devices can be connected, and each device provides some necessary operations (for example, as a server array, a group of blade servers, or a multiprocessor system). In FIG. 9, one processor 901 is taken as an example.

The memory 902 is the non-transitory computer-readable storage medium provided by the present application. Where the memory stores instructions executable by at least one processor to cause the at least one processor to perform the method for digitizing paper data provided by the application. The non-transitory computer-readable storage medium of the present application stores computer instructions, and the computer instructions are used to cause a computer to perform the method for digitizing paper data provided by the present application.

As a non-transitory computer-readable storage medium, the memory 902 can be configured to store non-transitory software programs, non-transitory computer-executable programs and modules, such as program instructions/modules corresponding to the method for digitizing paper data in the embodiment of the present application (for example, the template-determining unit 71, the recognizing unit 72 and the generating unit 73 shown in FIG. 7). The processor 901 executes various functional applications and data processing of the server by running non-transitory software programs, instructions and modules stored in the memory 902, that is, implements the method for digitizing paper data in the above method embodiments.

The memory 902 may include a program-storage area and a data-storage area, where the program-storage area may store an operating system, an application program required by at least one function; the data-storage area may store data created according to the use of the electronic device, etc. In addition, the memory 902 may include a high-speed random access memory, and may also include a non-transitory memory, such as at least one disk storage component, flash storage component, or other non-transitory solid-state storage components. In some embodiments, the memory 902 may optionally include memories remotely located relative to the processor 901, and these remote memories may be connected to electronic devices through a network. Examples of the above network include, but are not limited to, the Internet, intranet, local area network, mobile communication network and combinations thereof.

The electronic device may further include: an input apparatus 903 and an output apparatus 904. The processor 901, the memory 902, the input apparatus 903, and the output apparatus 904 can be connected through a bus or other methods, being connected through a bus is taken as an example in FIG. 9.

The input apparatus 903 can receive inputted digital or character information and generate a key signal input related to the user setting and the function control of the electronic device for digitizing paper data, such as a touch screen, a keypad, a mouse, a track pad, a touch pad, an indicator stick, one or more mouse buttons, a trackball, a joystick and other input apparatuses. The output apparatus 904 may include display devices, auxiliary lighting devices (e.g., LEDs), haptic feedback devices (e.g., vibration motors), and the like. The display device may include, but is not limited to, a liquid crystal display (LCD), a light emitting diode (LED) display, and a plasma display. In some embodiments, the display device may be a touch screen.

The various embodiments of the systems and technologies described herein may be implemented in digital electronic circuit systems, integrated circuit systems, ASIC (application specific integrated circuits), computer hardware, firmware, software, and/or combinations thereof. These various embodiments may include: being implemented in one or more computer programs, the one or more computer programs can be executed and/or interpreted on a programmable system including at least one programmable processor, the programmable processor can be a special or general programmable processor, and can receive data and instructions from a storage system, at least one input apparatus, and at least one output apparatus, and transmit data and instructions to the storage system, the at least one input apparatus, and the at least one output apparatus.

The computer programs (also called programs, software, software applications, or codes) include machine instructions of programmable processors, and can be implemented using advanced procedures and/or object-oriented programming languages, and/or assembly/machine languages. As used herein, the terms "machine-readable medium" and "computer-readable medium" refer to any computer program product, device, and/or apparatus (e.g., magnetic disks, optical disks, memories, programmable logic devices (PLD)) for providing machine instructions and/or data to a programmable processor, including machine-readable mediums that receive machine instructions as machine-readable signals. The term "machine readable signal" refers to any signal used to provide machine instructions and/or data to a programmable processor.

To provide interactions with users, the systems and technologies described herein can be implemented on a computer, the computer has: a display device (e.g., a CRT (cathode ray tube) or an LCD (liquid crystal display) monitor) for displaying information to users; and a keyboard and a pointing device (e.g., a mouse or a trackball) through which users can provide input to the computer. Other kinds of devices can also be configured to provide interactions with users; for example, feedbacks provided to users can be any form of sensory feedback (for example, visual feedback, auditory feedback, or haptic feedback); the input from users can be received in any form (including sound input, voice input or haptic input).

The systems and technologies described herein can be implemented in a computing system including background components (e.g., as a data server), or a computing system including middleware components (e.g., an application server), or a computing system including front-end components (e.g., a user computer with a graphical user interface or a web browser, users can interact with implementations of the systems and technologies described herein through the graphical user interface or the web browser), or in a computing system including any combination of such background components, middleware components, or front-end components. Components of the system can be connected to each other through digital data communication in any form or medium (e.g., a communication network). Examples of communication networks include local area networks (LANs), wide area networks (WANs), and the Internet.

A computer system may include a client and a server. The client and the server are generally remote from each other and usually interact through communication networks. The relationship between the client and the server is generated by computer programs running on corresponding computers and having a client-server relationship with each other.

It should be understood that steps can be rearranged, added or deleted using various forms of procedures shown above. For example, the steps described in the present application can be executed in parallel, sequentially or in a different order, as long as the expected result of the technical solution disclosed in the present application can be implemented, and there is no limitation here.

The above specific embodiments do not limit the protection scope of the present application. It should be understood by those skilled in the art that various modifications, combinations, sub-combinations and substitutions can be made according to design requirements and other factors. Any modifications, equivalent substitutions and improvements made within the spirit and principle of the present application shall be included in the protection.

What is claimed is:

1. A method for converting paper data, comprising:
   in response to a mark instruction for an image to be processed, displaying a mark position in the image to be processed and determining mark information, wherein the mark instruction is issued by a user to mark the image to be processed, and the mark information is used to mark a range of data content recorded in the image to be processed;
   determining a standard template according to the image to be processed and the determined mark information, wherein the image to be processed is obtained by photographing the paper data and the standard template is used to represent a reference coordinate system of the image to be processed;
   recognizing graphic handwriting information comprised in the image to be processed, wherein the recognized graphic handwriting information is a trace drawn artificially in the image to be processed; and
   generating digitized data corresponding to the image to be processed according to the graphic handwriting information and the standard template;
   wherein the generating digitized data corresponding to the image to be processed according to the graphic handwriting information and the standard template comprises:
   mapping the graphic handwriting information into the standard template to obtain an initial digitized table, wherein the initial digitized table comprises the graphic handwriting information;
   thinning the graphic handwriting information in the initial digitized table to obtain handwriting with a width of a single pixel, wherein the handwriting with the width of the single pixel is thinner than the trace drawn; and
   determining the digitized data corresponding to the image to be processed according to the handwriting with the width of the single pixel and the reference coordinate system comprised in the standard template.

2. The method according to claim 1, wherein the mark information comprises coordinate point information, and the determining the standard template according to the image to be processed and the mark information corresponding to the image to be processed comprises:
   fitting according to the coordinate point information to obtain coordinate system information; and
   determining the standard template according to the image to be processed and the coordinate system information.

3. The method according to claim 1, wherein the mark instruction comprises at least one of a positioning point mark instruction and a coordinate point mark instruction, and the mark information comprises at least one of positioning point information and coordinate point information.

4. The method according to claim 3, wherein the positioning point information comprises a frame positioning point of the image to be processed, and the frame positioning point is used to define a range of the standard template.

5. The method according to claim 1, wherein the recognizing the graphic handwriting information comprised in the image to be processed comprises:
   inputting the image to be processed into a preset semantic segmentation model, and outputting the graphic handwriting information comprised in the image to be processed, wherein the semantic segmentation model is used to determine the graphic handwriting information comprised in the image to be processed.

6. The method according to claim 5, wherein the graphic handwriting information comprises graphic handwriting and a position of the graphic handwriting in the image to be processed, and the preset semantic segmentation model is specifically used to:
   determine at least one of a first probability value that a respective pixel in the image to be processed belongs to the graphic handwriting and a second probability value that the respective pixel in the image to be processed does not belong to the graphic handwriting;
   determine whether the pixel belongs to the graphic handwriting according to at least one of the first probability value and the second probability value; and
   determine the graphic handwriting information according to pixels belonging to the graphic handwriting.

7. The method according to claim 1, wherein the mark information comprises positioning point information, and the standard template comprises the positioning point information;
   the mapping the graphic handwriting information into the standard template to obtain the initial digitized table comprises:
   in response to a mark operation to the graphic handwriting information, determining a matching position corresponding to the positioning point information in the standard template in the graphic handwriting information; and
   mapping, according to a corresponding relationship between the positioning point information and the matching position, the graphic handwriting information into the standard template to obtain the initial digitized table.

8. The method according to claim 1, wherein the mapping the graphic handwriting information into the standard template to obtain the initial digitized table comprises:
   in response to a matching operation to the graphic handwriting information and the standard template, determining a first matching position in the graphic handwriting information, and determining a second matching position in the standard template, wherein the first matching position corresponds to the second matching position; and mapping, according to a corresponding relationship between the first matching position and the second matching position, the graphic handwriting information into the standard template to obtain the initial digitized table.

9. The method according to claim 1, wherein the thinning the graphic handwriting information in the initial digitized table to obtain the handwriting with the width of the single pixel comprises:

processing the graphic handwriting information in the initial digitized table based on a skeleton extraction algorithm to obtain the handwriting with the width of the single pixel.

10. The method according to claim 1, wherein the determining the digitized data corresponding to the image to be processed according to the handwriting with the width of the single pixel and the reference coordinate system comprised in the standard template comprises:

determining numerical information corresponding to each pixel in the handwriting according to the handwriting with the width of the single pixel and the reference coordinate system comprised in the standard template; and determining the digitized data corresponding to the image to be processed according to the numerical information.

11. The method according to claim 10, wherein the numerical information corresponding to each pixel in the handwriting comprises an abscissa and an ordinate corresponding to each pixel in the reference coordinate system comprised in the standard template.

12. A non-transitory computer-readable storage medium storing computer instructions, the computer instructions are used to cause a computer to perform the method according to claim 1.

13. An electronic device, comprising:

at least one processor; and a memory communicatively connected to the at least one processor;

wherein the memory stores instructions executable by the at least one processor, and the instructions are executed by the at least one processor to cause the at least one processor to:

in response to a mark instruction for an image to be processed, display a mark position in the image to be processed and determine mark information, wherein the mark instruction is issued by a user to mark the image to be processed, and the mark information is used to mark a range of data content recorded in the image to be processed;

determine a standard template according to the image to be processed and the determined mark information, wherein the image to be processed is obtained by photographing paper data and the standard template is used to represent a reference coordinate system of the image to be processed;

recognize graphic handwriting information comprised in the image to be processed, wherein the recognized graphic handwriting information is a trace drawn artificially in the image to be processed; and generate digitized data corresponding to the image to be processed according to the graphic handwriting information and the standard template;

wherein the processor is further caused to:

map the graphic handwriting information into the standard template to obtain an initial digitized table, wherein the initial digitized table comprises the graphic handwriting information;

thin the graphic handwriting information in the initial digitized table to obtain handwriting with a width of a single pixel, wherein the handwriting with the width of the single pixel is thinner than the trace drawn; and determine the digitized data corresponding to the image to be processed according to the handwriting with the width of the single pixel and the reference coordinate system comprised in the standard template.

14. The electronic device according to claim 13, wherein the mark information comprises coordinate point information, and the processor is caused to:

fit according to the coordinate point information to obtain coordinate system information; and determine the standard template according to the image to be processed and the coordinate system information.

15. The electronic device according to claim 13, wherein the mark instruction comprises at least one of a positioning point mark instruction and a coordinate point mark instruction, and the mark information comprises at least one of positioning point information and coordinate point information.

16. The electronic device according to claim 13, wherein the processor is specifically caused to:

input the image to be processed into a preset semantic segmentation model, and output the graphic handwriting information comprised in the image to be processed, wherein the semantic segmentation model is used to determine the graphic handwriting information comprised in the image to be processed.

17. The electronic device according to claim 16, wherein the graphic handwriting information comprises graphic handwriting and a position of the graphic handwriting in the image to be processed, and the processor is specifically caused to:

determine at least one of a first probability value that a respective pixel in the image to be processed belongs to the graphic handwriting and a second probability value that the respective pixel in the image to be processed does not belong to the graphic handwriting;

determine whether the pixel belongs to the graphic handwriting according to at least one of the first probability value and the second probability value; and determine the graphic handwriting information according to pixels belonging to the graphic handwriting.

* * * * *